United States Patent
Szechenyi et al.

(10) Patent No.: US 6,823,139 B2
(45) Date of Patent: *Nov. 23, 2004

(54) OPTICAL TRANSMISSION SYSTEM

(75) Inventors: Kalman Szechenyi, Spiegelberg (DE); Albrecht Schaffert, Gerlingen (DE)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/241,270

(22) Filed: Sep. 9, 2002

(65) Prior Publication Data

US 2003/0011842 A1 Jan. 16, 2003

Related U.S. Application Data

(63) Continuation of application No. 09/010,334, filed on Jan. 21, 1998, now Pat. No. 6,490,065.

(30) Foreign Application Priority Data

Jan. 21, 1997 (DE) .......................................... 197 01 888

(51) Int. Cl.⁷ ............................................... H04J 14/02
(52) U.S. Cl. .............................. 398/72; 398/70; 398/71
(58) Field of Search ............................... 359/118, 125, 359/127–129, 133; 398/68, 70, 71, 72, 82

(56) References Cited

U.S. PATENT DOCUMENTS

| | | | |
|---|---|---|---|
| 5,136,411 A | 8/1992 | Paik et al. | 359/125 |
| 5,181,106 A | 1/1993 | Sutherland | 359/164 |

(List continued on next page.)

FOREIGN PATENT DOCUMENTS

| | | | |
|---|---|---|---|
| DD | 34 03 206 A1 | 1/1985 | |
| DD | 39 07 497 A1 | 9/1990 | |
| DE | 44 33 895 A1 | 3/1996 | |
| EP | 0 355 877 A1 | 6/1989 | |
| EP | 0 739 908 A1 | 6/1994 | |
| EP | 0 703 681 A2 | 8/1995 | ......... H04B/10/207 |
| EP | 0 735 768 A1 | 10/1996 | |
| WO | WO 95/05041 | 2/1995 | |
| WO | WO 97/01236 | 1/1997 | |

OTHER PUBLICATIONS

J. Speidel, T.J.B. Swanenburg & H. Tamm, "New Fibre network in the local loop for telecommunication and TV distribution services", Dec. 1991, Philips telecommunication review vol. 49, No. 4.

A.M. Hill et al., "An Experimental Broadband and Telephony Passive Optical Network", Globecom IEEE Global Telecommunications Conference & Exhibition, San Diego, California, Dec. 1990.

*Primary Examiner*—Leslie Pascal

(57) ABSTRACT

A system (SYS) for optically transmitting information, e.g., television signals, from a subcenter (HUB), e.g., a cable television head end, over a passive optical distribution network to a plurality of optical network units (ONU) includes a plurality of nodes (K1, . . . , Km) for optically transmitting further information, e.g., telephone signals, and a plurality of optical couplers (C1, C2). The further information of each node (K1, . . . , Km) is fed via a respective coupler (C1, C2) into a transmission line connected to only part of the plurality of optical network units (ONU), e.g., to only one optical network unit (ONU). Each optical network unit (ONU) is connected to a group of customer locations (END) and, for the transmission of information from this group of customer locations (END), via a further passive optical distribution network to a node (K1, . . . , Km). Each node (K1, . . . , Km,) includes means for separating the information received from the customer locations into, e.g., interactive request signals and telephone signals. The interactive request signals are routed to the subcenter (HUB), and the telephone signals to a telephone network (NET).

4 Claims, 3 Drawing Sheets

U.S. PATENT DOCUMENTS

| | | | |
|---|---|---|---|
| 5,202,780 A | * | 4/1993 | Fussanger .................... 359/125 |
| 5,337,175 A | | 8/1994 | Ohnsorge et al. ........... 359/125 |
| 5,510,921 A | | 4/1996 | Takai et al. ................. 359/124 |
| 5,517,232 A | | 5/1996 | Heidemann et al. ........... 348/7 |
| 5,550,666 A | | 8/1996 | Zirngibl ....................... 359/125 |
| 5,559,624 A | * | 9/1996 | Darcie et al. ............... 359/125 |
| 5,701,186 A | | 12/1997 | Huber ........................ 359/125 |
| 6,490,065 B2 | * | 12/2002 | Szechenyi et al. .......... 359/125 |

* cited by examiner

OPTICAL TRANSMISSION SYSTEM

This application is a continuation of application Ser. No. 09/010,334 filed Jan. 21, 1998, now U.S. Pat. No. 6,490,065.

This invention relates to an optical transmission system as set forth in the preamble of claim 1.

WO 95/05041 discloses a system for optically transmitting information from a subcenter to a plurality of optical network units via a plurality of optical transmission lines. The subcenter is connected to the optical network units by a passive optical distribution network consisting of optical transmission lines and an optical splitter. At the subcenter, a plurality of electric subcarrier signals are combined into a frequency-division multiplex signal and subsequently converted from electrical to optical form. The subcarrier signals are television signals, for example, which are destined for all optical network units, and telephone signals, each of which is destined for only one of the optical network units. For the telephone signals, unlike the television signals, only a small frequency range is reserved. If a multitude of customer locations are connected via the optical network units to the subcenter, this relatively small frequency range does not suffice to make available a sufficient number of channels for the multitude of customer locations.

It is therefore an object of the invention to provide an optical transmission system which can transmit different information to a plurality of optical network units more flexibly.

This object is attained by the teaching of claim 1. The invention is characterized in that the system comprises a plurality of nodes for optically transmitting further information and a plurality of optical couplers, and that the further information of each of the nodes is fed via a respective coupler into a transmission line connected to only part of the plurality of optical network units. The combination of the information, for example television signals, and the further information, for example telephone signals, via the optical couplers and the division of the further information among those transmission lines which are connected to the respective optical network unit for which the respective further information is exclusively intended optimize the utilization of the available transmission capacity. Furthermore, the expansion capability of the system is improved, since for each further optical network unit, for example, only one additional optical transmission and one optical splitter are needed.

The invention will become more apparent from the following description of three embodiments when taken in conjunction with the accompanying drawings, in which.

Figure 1:
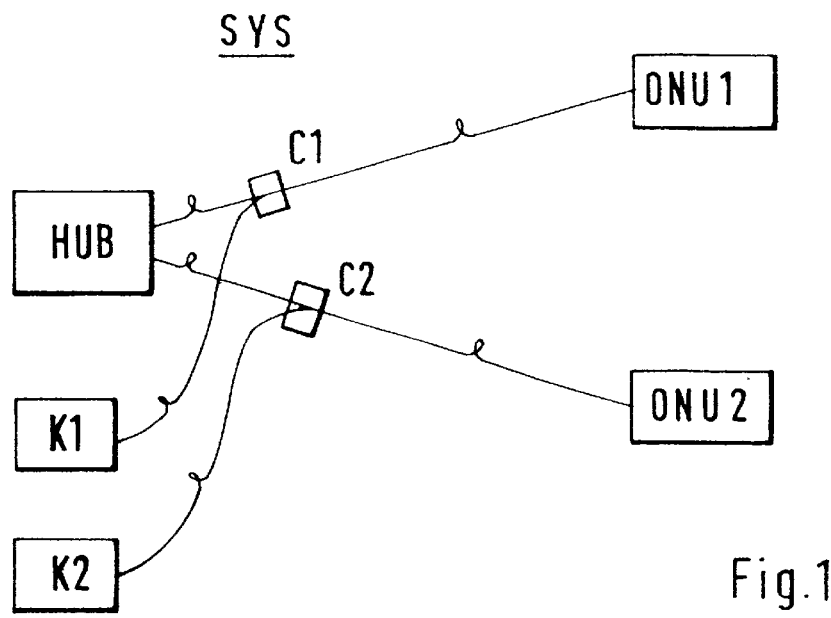
FIG. 1 is a schematic representation of a first optical transmission system according to the invention.

Referring to FIG. 1, which shows a first embodiment of an optical transmission system SYS in accordance with the invention, the system SYS includes a subcenter HUB which is connected by a first optical transmission line to an optical network unit ONU1 and by a second optical transmission line to an optical network unit ONU2. From the subcenter, first information is transmitted to the optical network unit ONU1, and second information to the optical network unit ONU2. The first and second information may be identical, e.g., in the case of a distribution service, such as the distribution of television signals, or different, e.g., in the case of a data transmission.

The system SYS further includes two nodes K1, K2 for optically transmitting further information. The further information of the node K1, e.g., telephone signals or data signals, is destined exclusively for the optical network unit ONU1 and not for the optical network unit ONU2. Therefore, the further information of the node K1 is transmitted to the optical network unit ONU1 via a further transmission line and an optical coupler C1 inserted in the first transmission line, and then, together with the information from the subcenter HUB, via a part of the first transmission line.

The further information of the node K2, e.g., telephone signals or data signals, is destined exclusively for the optical network unit ONU2 and not for the optical network unit ONU1. Therefore, the further information of the node K2 is transmitted to the optical network unit ONU2 via a further transmission line and an optical coupler C2 inserted in the second transmission line and then, together with the information from the subcenter HUB, via a part of the second transmission line.

Thus, the further information from the nodes K1 and K2 is optically combined with the information from the subcenter HUB and fed to the optical network units ONU1 and ONU2, respectively, each of which is connected to a group of customer locations, for example. In this manner, groups of customer locations can be supplied at low cost both with broadcast information and with specific information destined exclusively for the respective group of customer locations, with optimum use being made of the existing transmission capacity.

Figure 2:
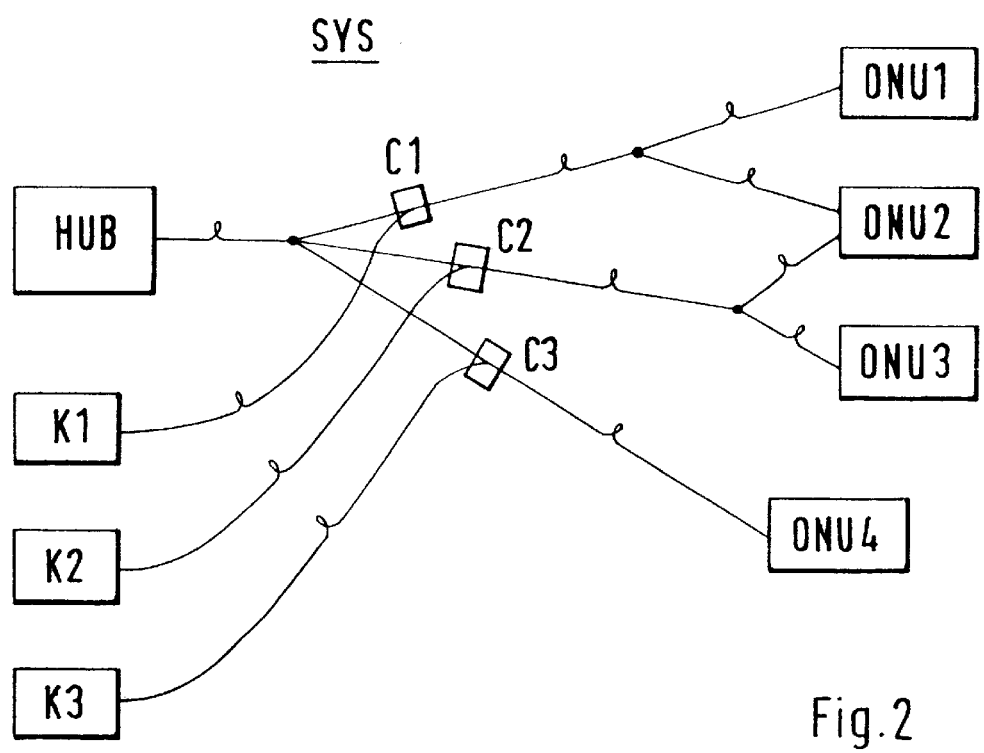
FIG. 2 is a schematic representation of a second optical transmission system according to the invention.

Referring to FIG. 2, which shows a second embodiment of an optical transmission system SYS in accordance with the invention, the system SYS includes a subcenter HUB which is connected to four optical network units ONU1, ONU2, ONU3, ONU4 by a passive optical network consisting of optical transmission lines and three optical splitters. The optical network unit ONU2 is connected to the subcenter HUB by two different paths. Through this redundancy, the optical network unit ONU2 receives the information from the subcenter HUB doubly and can select therefrom. The introduction of two different paths serves to ensure, inter alia, continued availability of a connection in the event of a failure.

The system SYS further includes three nodes K1, K2, K3 for optically transmitting further information, particularly information which is destined exclusively for one or two of the four optical network units ONU1, ONU2, ONU3, ONU4.

The further information of the node K1 is destined for the optical network units ONU1 and ONU2. It is transmitted to these units via an additional optical transmission line and an optical coupler C1 which is inserted in the optical transmission line connected via an optical splitter to the optical network units ONU1 and ONU2.

The further information of the node K2 is destined for the optical network units ONU2 and ONU3. It is fed via an additional optical transmission line and an optical coupler C2 into the transmission line which is connected via an optical splitter to the optical network units ONU2 and ONU3. In this manner, the further information of the node K2 reaches both the optical network unit ONU2 and the optical network unit ONU3. The further information of the node K1 and the further information of the node K2 which is destined for the optical network unit ONU2 may be identical, which provides redundancy and ensures continued availability of a connection in the event of a failure of a connection, or different, which results in increased transmission capacity, for example twice the transmission capacity when compared with the optical network units ONU1 and ONU2. The division of the available transmission channels among the optical network units ONU1, ONU2, and ONU3 may also be dynamic, so that a division adapted to the traffic volume can be effected during operation. If the transmission capacity of node K1 is 10 Mb/s, for example, then 6 Mb/s, for example, can be used for the optical network unit ONU1, and 4 Mb/s for the optical network unit ONU2. If the transmission capacity of node K2 is also 10 Mb/s, for example, then 6 Mb/s, for example, can be used for the optical network unit ONU3, and 4 Mb/s for the optical network unit ONU2, so that a total of 8 Mb/s is available for the optical network unit ONU2.

If the traffic volume changes, 5 Mb/s, for example, can be used for the optical network unit ONU1 via node K1, and 5 Mb/s for the optical network unit ONU2, and 5 Mb/s, for example, can be used for the optical network unit ONU3 via node K2, and 5 Mb/s for the optical network unit ONU2, so that a total of 10 Mb/s is available for the optical network unit ONU2.

The further information of node K3 is destined exclusively for optical network unit ONU4. It is fed via an additional optical transmission line and an optical coupler C3 into the transmission line which is connected directly to optical network unit ONU4.

Figure 3:
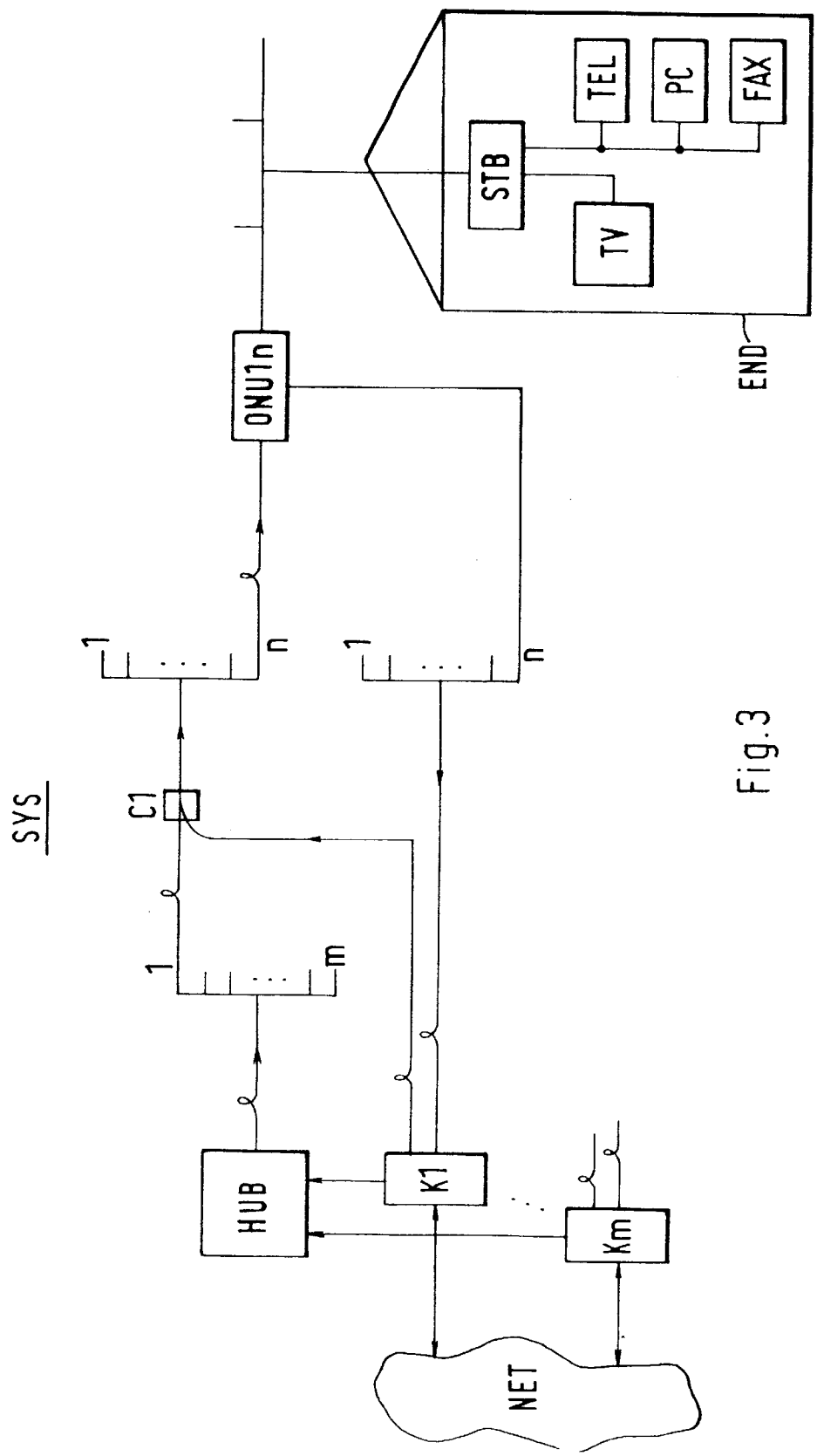
FIG. 3 is a schematic representation of a third optical transmission system according to the invention.

A third embodiment of the invention will now be explained with the aid of FIGS. 3 and 4. FIG. 3 shows an optical transmission system SYS in accordance with the invention. The system SYS is a hybrid fiber/coax access system, for example, which serves to transmit analog and/or digital television and video signals from a subcenter HUB to a plurality of customer locations END as well as interactive request signals from the plurality of customer locations END to the subcenter HUB. Of the customer locations END, one is shown by way of example. The system SYS further serves to transmit data and/or telephone signals from a plurality of nodes K1, ..., Km to groups of customer locations END as well as telephone and/or data signals from groups of customer locations END to the nodes K1, ..., Km.

The signals to be transmitted from the subcenter HUB, e.g., a cable television head end, are converted from electrical to optical form at the subcenter and transmitted over a passive optical distribution network consisting of optical transmission lines, such as glass fiber cables, and optical splitters to a plurality of optical network units ONU1n, of which one is shown. In each optical network unit ONU1n, the received signals are converted from optical to electrical form, and the electrical signals are then transmitted over coaxial cable to a group of customer locations END. The video signals are, for example, movies, educational programs or the like which are selected by customers in an interactive mode.

The customer location END has its own in-house network, to which the customer has access and can connect various terminals. The terminals are, for example, a computer PC, connected via a modem, and a television set TV, a telephone TEL, and a fax machine FAX, which are connected via a set-top box STB.

The passive optical distribution network includes one 1:m optical splitter and m 1:n optical splitters, for example, where m and n are natural numbers, e.g., m=10, n=10. Thus, 100 optical network units ONU1n are connectable to the subcenter HUB.

Each of the nodes K1, ..., Km is connected to the associated optical network units ONU1n in two ways. Node K1, for example, is connected to the n optical network units ONU1n via an additional optical transmission line and an optical coupler C1 inserted in the first transmission line after the 1: m splitter, and the optical network units ONU1n are connected to this first optical transmission line via a 1:n splitter. The further information of node K1, e.g., television signals, thus reaches n optical network units ONU1n. Connected to each optical network unit ONU1n is a group of customer locations END. Each group consists of 20 customer locations END, for example, so that 200 customer locations are connected to node K1. Node K1 establishes telephone or video-telephone connections, for example, to these customer locations END. The transmission of information from the customer locations END to the node K1 takes place via an additional passive optical distribution network, for example a network with an n:1 optical combiner as shown in FIG. 3, or via n separate transmission lines which each connect one optical network unit ONU1n directly to the node K1. Depending on the transmission capacity available in the backstream frequency band and on the number of customer locations END, the additional passive optical distribution network may also be in a mixed form consisting of a plurality of optical combiners and a plurality of direct connections. The method used to access the customer locations END is CMDA (code division multiple access). Nodes K2 to Km are connected to the associated optical network units and the groups of customer locations END in a manner similar to node K1. The transmission of information takes place correspondingly. Each of the nodes K1, ..., Km is connected to the subcenter HUB by an optical or electric transmission line. They include means for separating the information received from the optical network units ONU1n connected to them and means for routing part of the information received from the optical network units ONU to the subcenter HUB. The information from the optical network units ONU1n contains interactive request signals and telephone signals, for example. The first means separates the request signals and the telephone signals; this can be done, for example, with electrical bandpass filters following an optical-to-electrical conversion. The second means, e.g., an electrical-to-optical transducer, passes the request signals on to the subcenter.

The nodes K1, ..., Km are connected, for example, to a telephone network NET, such as an integrated services digital network (ISDN). Via each node K1, ..., Km, telephone signals are transmitted from the ISDN to the group of customer locations END and from at least one group of customer locations END into the ISDN.

Figure 4:
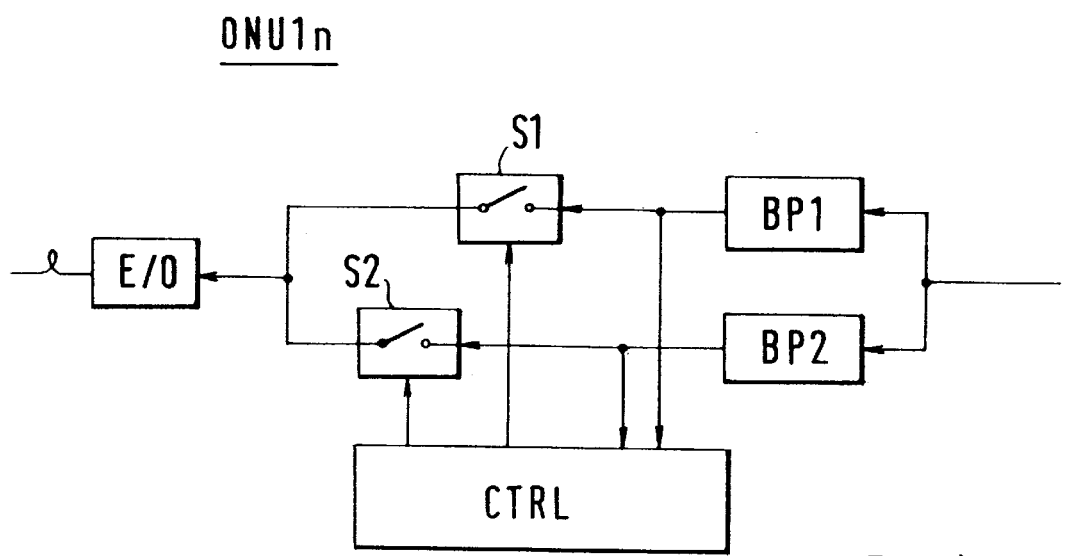
FIG. 4 is a schematic block diagram of a portion of the optical network unit of FIG. 3.

FIG. 4 shows a portion of the optical network unit ONU1n of FIG. 3, namely a link which is used for transmitting information from the customer locations to the nodes. The link serves to suppress interference and contains two switches S1, S2, two bandpass filters BP1, BP2, a control unit CTRL, and an electrical-to-optical transducer E/O.

The two switches S1, S2 serve to block or unblock at least part of the frequency band used to transmit information to the respective node K1, ..., Km. If no transmission is to take place in this part of the frequency band, this part will be blocked.

The two bandpass filters BP1, BP2, which can be replaced by diplexers or bandstop filters, serve to separate the frequency band used to transmit information to the respective node K1, ..., Km. The bandpass filter BP1 blocks all frequencies except those for the interactive signals, for example. The bandpass filter BP2 blocks all frequencies except those for the telephone signals, for example.

The control unit CTRL serves to detect the signal levels in the separated frequency bands and to control the two switches S1, S2. To accomplish this, the control unit CTRL includes an amplitude detector, for example, which detects the amplitudes of the interactive request signals and the telephone signals and compares them with an upper and a lower threshold.

The upper threshold is a maximum value which must not be exceeded because otherwise errors will be caused on the transmission line. The lower threshold is a minimum value below which the amplitudes must not fall, since as a result of the attenuation on the transmission line, the signal is no longer detectable in the node. The two switches Si and S2 are controlled in such a way that, if the respective signal level is below a preset minimum threshold or above a preset upper threshold, the respective frequency band will be blocked.

In the electrical-to-optical transducer E/O, which is implemented with a directly modulated laser diode, for example, all signals in the frequency bands unblocked by the switches S1 and S2 are converted from electrical to optical form and subsequently transmitted to the associated node.

In the three embodiments, information is combined via optical couplers and transmitted over an optical transmission line. The information transmitted by the subcenter HUB and the further information transmitted by the plurality of nodes K1, . . . , Km can be transmitted on different wavelengths. This has the advantage that the possibility of interferences occurring during the combination of the information is reduced. In addition, a greater frequency range is thus available both for the subcenter HUB and for each individual node K1, . . . , Km, so that a greater number of transmission channels is possible.

What is claimed is:

1. A system (SYS) for optically transmitting information from a subcenter (HUB) over a plurality of optical transmission lines to a plurality of optical network units (ONU), characterized in that the system (SYS) comprises a plurality of nodes (K1, . . . , Km) for optically transmitting further information and a plurality of optical couplers (C1, C2), and that the further information of each of the nodes (K1, . . . , Km) is fed via a respective coupler (C1, C2) into a transmission line connected to only part of the plurality of optical network units (ONU), wherein the subcenter (HUB) transmits information at a first wavelength, wherein all nodes (K1, . . . , Km) transmit further information at a second wavelength, wherein each node (K1, . . . , Km) transmits further information being different from the further information of another node (K1, . . . , Km), wherein each optical coupler (C1, C2) couples the information of the subcenter (HUB) at the first wavelength and further information of one node (K1, . . . , Km) at the second wavelength, the system being further characterized in that the subcenter (HUB) is a cable television head end, that the information includes television signals, and that the cable television head end is connected to the plurality of optical network units (ONU) via an optical distribution network with at least one optical splitter, the system being additionally characterized in that the further information includes telephone signals, that the plurality of nodes (K1, . . . , Km) are connectable to a telephone network (NET), that each of the plurality of optical network units (ONU) is connectable to a respective groups of customer locations (END), and that through each of the plurality of nodes (K1, . . . , Km), telephone signals are transmitted to at least one group of customer locations (END), and the system also being characterized in that the information to be transmitted by the plurality of optical network units (ONU) includes interactive request signals and telephone signals, and that the interactive request signals and the telephone signals are transmitted to the subcenter (HUB) and the telephone network (NET), respectively.

2. A system (SYS) as claimed in claim 1, characterized in that the plurality of optical network units (ONU) are connected to the plurality of nodes (K1, . . . , Km) by further optical transmission lines.

3. A system (SYS) as claimed in claim 2, characterized in that the plurality of nodes (K1, . . . , Km) are connected to the subcenter (HUB) and comprise means for separating the information received from the plurality of optical network units (ONU) and means for routing part of the information received from the optical network units (ONU) to the subcenter (HUB).

4. The system of claim 1, wherein the television signals are unidirectional from the subcenter (HUB) to the optical network units (ONU), the interactive request signals are unidirectional from the optical network units (ONU) to the subcenter (HUB) via the nodes, and the telephone signals are bidirectional from the telephone network to the optical network units (ONU) via the nodes.

* * * * *

UNITED STATES PATENT AND TRADEMARK OFFICE
CERTIFICATE OF CORRECTION

PATENT NO. : 6,823,139 B2
DATED : November 23, 2004
INVENTOR(S) : Szechenyi et al.

It is certified that error appears in the above-identified patent and that said Letters Patent is hereby corrected as shown below:

Title page,
Item [56], References Cited, FOREIGN PATENT DOCUMENTS, please change "DD 34 03 206 A1 1/1985" to -- DE 34 03 206 A1 1/1985 --;
please change "DD 39 07 497 A1 1/1990" to -- DE 39 07 497 A1 1/1990 --; and
please change "EP 0 739 908 A1 6/1994" to -- EP 0 639 908 A1 6/1994 --.

Signed and Sealed this

Eighth Day of March, 2005

JON W. DUDAS
*Director of the United States Patent and Trademark Office*